United States Patent
Asheim et al.

(10) Patent No.: US 10,233,907 B2
(45) Date of Patent: Mar. 19, 2019

(54) OPERATING A WIND TURBINE BY REDUCING AN ACOUSTIC EMISSION DURING OPERATION

(71) Applicant: Siemens Aktiengesellschaft, München (DE)

(72) Inventors: Michael J. Asheim, Littleton, CO (US); Steven Buck, Boulder, CO (US)

(73) Assignee: Siemens Aktiengesellschaft (DE)

( * ) Notice: Subject to any disclaimer, the term of this patent is extended or adjusted under 35 U.S.C. 154(b) by 112 days.

(21) Appl. No.: 15/366,310

(22) Filed: Dec. 1, 2016

(65) Prior Publication Data
US 2017/0175714 A1 Jun. 22, 2017

(30) Foreign Application Priority Data
Dec. 18, 2015 (EP) .................................... 15201323

(51) Int. Cl.
*G05D 3/12* (2006.01)
*F03D 17/00* (2016.01)
*F03D 7/02* (2006.01)
*F03D 7/00* (2006.01)
*G05B 17/02* (2006.01)

(52) U.S. Cl.
CPC .............. *F03D 17/00* (2016.05); *F03D 7/00* (2013.01); *F03D 7/0296* (2013.01); *G05B 17/02* (2013.01); *F05B 2260/96* (2013.01); *F05B 2270/32* (2013.01); *F05B 2270/322* (2013.01); *F05B 2270/331* (2013.01); *F05B 2270/332* (2013.01); *F05B 2270/333* (2013.01); *F05B 2270/807* (2013.01); *F05B 2270/808* (2013.01); *F05B 2270/81* (2013.01); *Y02E 10/723* (2013.01)

(58) Field of Classification Search
CPC ..................................................... Y02E 10/723
USPC .......................................................... 700/287
See application file for complete search history.

(56) References Cited

U.S. PATENT DOCUMENTS 7,883,317 B2    2/2011  Ormel et al.
7,898,100 B2 *  3/2011  Andersen .............. F03D 7/0224
                                                            290/43
(Continued)

FOREIGN PATENT DOCUMENTS

CN    101235799 A    8/2008
CN    102889176 A    1/2013
(Continued)

OTHER PUBLICATIONS

Extended European Search Report for Application No. 15201323.1, dated Jun. 10, 2016.
(Continued)

*Primary Examiner* — Suresh Suryawanshi
(74) *Attorney, Agent, or Firm* — Schmeiser Olsen & Watts, LLP

(57) ABSTRACT

A method is proposed for operating a wind turbine, including the following steps: deriving at least one turbulence characteristic of atmosphere hitting the wind turbine, determining at least one wind turbine specific parameter based on the at least one derived turbulence characteristic, and operating the wind turbine according to the at least one determined turbine specific parameter is provided. Further, a wind turbine and a device as well as a computer program product and a computer readable medium are also provided.

14 Claims, 3 Drawing Sheets

(56) References Cited

U.S. PATENT DOCUMENTS

| | | | |
|---|---|---|---|
| 8,408,871 B2* | 4/2013 | Herr | F03D 7/0224 |
| | | | 415/26 |
| 8,803,351 B2* | 8/2014 | Dalsgaard | F03D 7/0224 |
| | | | 290/44 |
| 9,140,238 B2 | 9/2015 | Bjerge et al. | |
| 9,194,369 B2 | 11/2015 | Dixon et al. | |
| 9,206,786 B2* | 12/2015 | Andersen | F03D 7/0296 |
| 9,835,135 B2* | 12/2017 | Draper | F03D 7/028 |
| 2013/0161955 A1 | 6/2013 | Dalsgaard et al. | |
| 2014/0239639 A1* | 8/2014 | Bai | F03D 7/048 |
| | | | 290/44 |
| 2015/0115608 A1 | 4/2015 | Draper | |

FOREIGN PATENT DOCUMENTS

| | | |
|---|---|---|
| CN | 103306895 A | 9/2013 |
| EP | 2306004 A2 | 4/2011 |
| WO | WO 2014078770 A1 | 5/2014 |

OTHER PUBLICATIONS

Chinese Office Action dated Aug. 23, 2018 for application No. 201611166899.

\* cited by examiner

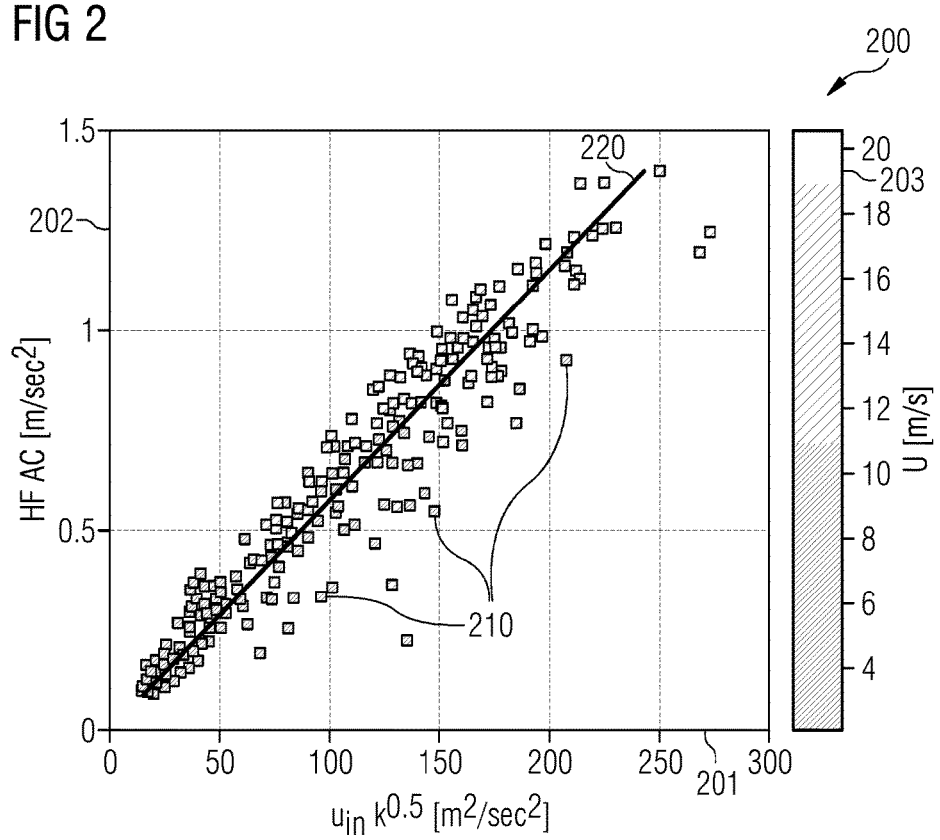

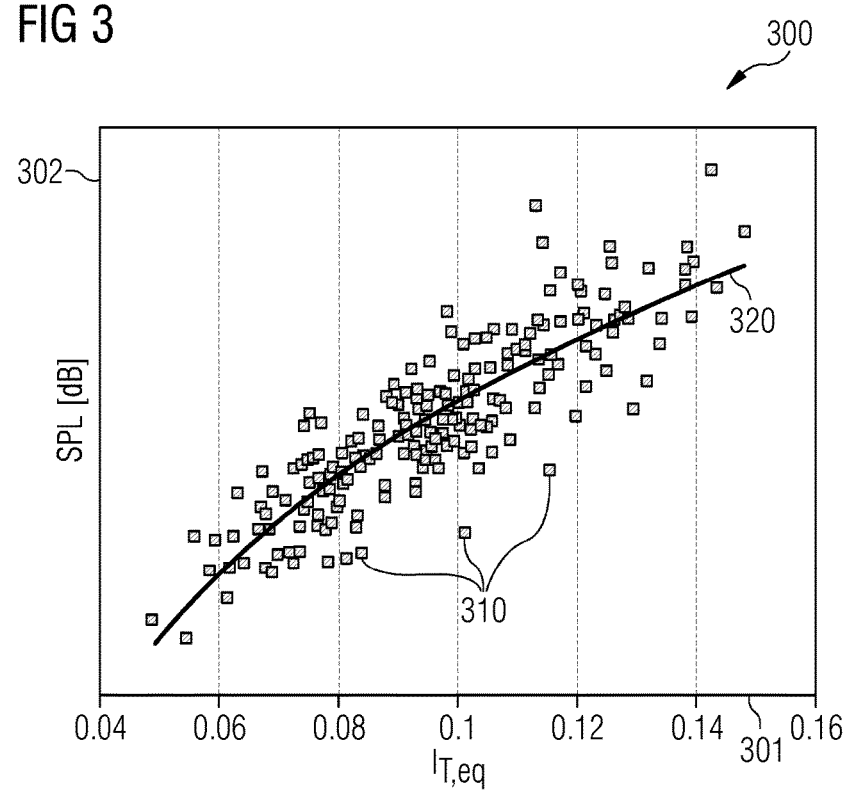

OPERATING A WIND TURBINE BY REDUCING AN ACOUSTIC EMISSION DURING OPERATION

CROSS-REFERENCE TO RELATED APPLICATIONS

This application claims priority to European application No. EP 15201323.1 having a filing date of Dec. 18, 2015, the entire contents of which are hereby incorporated by reference.

FIELD OF TECHNOLOGY

The following relates to a method, a wind turbine and to a device for operating a wind turbine. In addition, an according computer program product and a computer readable medium are suggested.

BACKGROUND

A growing concern related to wind turbines is acoustic emission, in particular emission of noise being also referred to as noise pollution or noise emission. Thereby, noise caused by incoming or inflowing wind, in particular caused by inflow wind turbulence hitting the wind turbine has long been suspected as a substantial contributor to wind turbine noise emissions. Especially high levels of wind turbulence result in increased acoustic emission. To compensate that, a wind turbine may be curtailed for high levels of turbulence in order to reduce the acoustic emission.

One possibility for determining turbulence characteristics like, e.g., measuring levels of turbulence (which may be also referred to as "turbulence intensity") of inflow wind has been based on cup anemometer wind speed measurements. Cup anemometers require averaging times on the order of, e.g., 10 minutes for measuring turbulence intensity and are therefore unsuitable for an accurate turbine control considering turbulence intensity.

According to one possible embodiment, one or more anemometers may be mounted on a meteorological tower ("MET tower") which may be located, e.g., approximately 200 m towards a predominant wind direction. Different types of anemometers may be used like, e.g., cup anemometer/wind vane combinations located at the tower at various heights. As an advantageous embodiment ultrasonic anemometers may be used comprising no moving parts and applying a sample rate of, e.g., 20 Hz, making them particularly suited for accurately resolving turbulence characteristics.

The distance between the wind turbine and the METtower may present some uncertainty in the resulting turbulence characteristics at a rotor plane of the wind turbine. That is the turbulence is measured 200 m upwind of the wind turbine and will evolve reaching the wind turbine.

SUMMARY

An aspect relates to overcoming the aforementioned disadvantages and in particular to provide an improved approach for operating a wind turbine, in particular by reducing the acoustic emission during operation of the wind turbine.

In order to overcome this problem, a method is provided for operating a wind turbine, comprising the following steps
- deriving at least one turbulence characteristic of atmosphere hitting the wind turbine,
- determining at least one wind turbine specific parameter based on the at least one derived turbulence characteristic, and
- operating the wind turbine according to the at least one determined turbine specific parameter.

The proposed solution is focusing on determining at least one wind turbine specific parameter like, e.g., acoustic emissions or fatigue loads based on at least one derived turbulence characteristic of atmosphere hitting the wind turbine thereby controlling operation of the wind turbine accordingly. By accurately and rapidly assessing turbulence characteristics and compensating appropriately by proper operation control a regulated handling of the at least one wind turbine specific parameter will be provided offering an adaptive control that will compensate possible changes in turbulence characteristics.

In an embodiment, the at least one wind turbine specific parameter is representing acoustic emissions.

The wind turbine specific parameter may be acoustic emission originating from the rotor blades of the wind turbine. The turbulence characteristic may be a level of turbulence ("turbulence intensity") of a incoming wind ("inflow turbulence") field wherein the level of turbulence of the wind field has a direct relationship ("Relation" or "correlation") with the acoustic emissions coming from the blades. By determining the inflow turbulence and having a general understanding of how the acoustic emission will scale with this (which may be specific to the individual machine, e.g. based on blade design or operation mode) several control strategies may be used to reduce the noise level.

In another embodiment, the method my comprise the following steps:
- deriving the at least one turbulence characteristic
  - based on at least one measured rotor blade characteristic of at least one rotor blade of the wind turbine, and
  - based on a first correlation between rotor blade characteristics of at least one rotor blade of the wind turbine and wind turbine specific inflow characteristics of atmosphere hitting the wind turbine,
- determining the at least one wind turbine specific parameter,
  - based on the at least one derived turbulence characteristic, and
  - based on a second correlation between turbine specific turbulence characteristics and turbine specific parameter.

By implementing measurements directly at the blades turbulence characteristics can be derived in seconds rather than several minutes.

The first correlation may represent a relation like, e.g., a proportionality between blade vibrations and inflow characteristic of atmosphere based on that the turbulence characteristic may be derived. For that, various parameters may be absorbed into a single proportionality constant, e.g. a density of air, a mass of the blade, a lift coefficient of the blade, etc. This single proportionality may readily be determined experimentally during setup of the wind turbine (i.e. before, e.g., by correlation between direct measurements of turbulence characteristics using wind speed anemometry and direct measurements of the blade vibrations.

The second correlation may represent a relation between the turbine specific parameter which may be acoustic emission and the turbulence characteristics derived based on the first correlation. Similar to the first correlation, the second correlation may be determined experimentally before start of operation of the wind turbine.

In a further embodiment, the at least one rotor blade characteristic is representing a vibration strength of at least one rotor blade.

In a next embodiment, the vibration strength of the at least one rotor blade is derived based on at least one measurement signal provided by
- at least one accelerator sensor, and/or
- at least one strain gage sensors, and/or
- at least one unsteady pressure sensor assigned to the at least one rotor blade.

Turbulence characteristic may be determined by sensors assigned to at least one rotor blade like, e.g., accelerometers or strain gauge sensors. Resulting measurement signals on the blades (either at the blade root or throughout a structure of the blades) may be used to determine the inflow turbulence. As an example, by analyzing a time history of these measurement signal an acceleration of blade vibrations may be determined giving a representation of the turbulence characteristic, i.e. turbulence structure hitting the blades.

Alternatively, turbulence characteristic may be determined by a direct measurement of a wind field in front of a rotor using a remote sensing technique. Possible embodiments would be a nacelle mounted LIDAR ("Light detection and ranging") or SODAR ("Sound/Sonic Detecting And Ranging") or RADAR.

Operating the wind turbine according to the at least one determined turbine specific parameter may depend on the kind of determination of turbulence characteristic (accelerometers, strain or remote sensing) and on control parameter(s) used by the wind turbine to control operation. Thereby, several control strategies/technologies may be applied to control acoustic emission if an increase of turbulence intensity is sensed.

This may include rotor RPM (revolutions per minute), combined pitch, individual pitch, passive or active flaps and even yaw angle. All of these methods would, e.g., have the same goal, to maintain the desired acoustic emission, characterized by at least one acoustic parameter such as SPL ("sound pressure level"), and therefore requiring compensation for increased levels of turbulence-induced noise. As an example, the control scheme will be optimized in order to maintain the desired acoustic emission while simultaneously maximizing electrical power output from the turbine.

It is also an embodiment that the at least one measurement signal is filtered in a definable frequency range.

As an example, the at least one measurement signal (like, e.g., provided by an accelerometer) may be processed, e.g., by transforming into a frequency domain and by applying a filter between, e.g., 5 Hz and 12.5 Hz.

Pursuant to another embodiment, a signal energy of the at least one filtered measurement signal is determined.

Based on the filtered measurement signal a vibration strength of the respective rotor blade may be derived as one possible parameter of blade characteristics.

The metric used for the vibration strength is an "integrated energy of the signal" ("signal energy"). This quantity may be also referred to as a "high frequency accelerometer content" (HFAC) and may be calculated according to equation:

$$HFAC = [\int_{f_1}^{f_2} S_{aa}(f) df]^{0.5}$$

wherein
$S_{aa}$ is the power spectral density of the accelerometer signal, and $f_1$ and $f_2$ are the lower and upper bounds, respectively, of the frequency range of interest.

According to an embodiment, the first correlation is representing a proportionality between the signal energy and a quantity $$k^{0.5} u_{in}$$

wherein
k is representing a turbulence kinetic energy,
$u_{in}$ is the local mean blade inflow speed (i.e. the inflow speed incident at each spanwise section of the blade due to the wind and the rotor's rotational motion)

According to another embodiment,
the at least one turbulence characteristic is representing:
- a turbulence intensity, or
- a turbulence kinetic energy, or
- a turbulence dissipation.

In yet another embodiment, a value of the turbulence intensity is derived according to:

$$I_T = \frac{1}{u_{in}} \sqrt{\frac{2}{3} k}$$

wherein
$I_T$ is representing the turbulence intensity
$u_{in}$ is the local mean blade inflow speed.
k is the turbulence kinetic energy According to a next embodiment, the turbulence kinetic energy is derived according to $$k = \left(\frac{A * HFAC}{u_{in}}\right)^2$$

wherein
A is a proportionality constant being defined by the first correlation,
HFAC is representing the signal energy,
$u_{in}$ is the local mean blade inflow speed.

The problem stated above is also solved by a wind turbine comprising
a processing unit that is arranged for
- deriving at least one turbulence characteristic of atmosphere hitting the wind turbine
- determining at least one wind turbine specific parameter based on the at least one derived turbulence characteristic and
- operating the wind turbine according to the at least one determined turbine specific parameter.

The problem stated above is also solved by a device comprising and/or being associated with a processor unit and/or hard-wired circuit and/or a logic device that is arranged such that the method as described herein is executable thereon.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

BRIEF DESCRIPTION

Some of the embodiments will be described in detail, with reference to the following figures, wherein like designations denote like members, wherein:

FIG. 2 illustrates a correlation between blade vibrations and turbulence intensity; and FIG. 3 shows a graph visualizing a correlation of sound pressure level SPL against turbulence intensity measured by blade accelerations.

DETAILED DESCRIPTION

Figure 1:
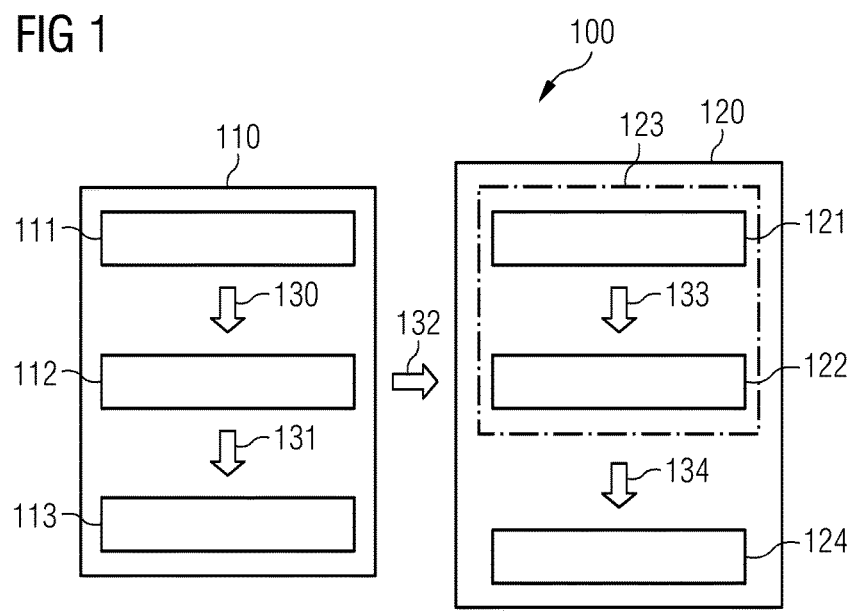
FIG. 1 shows in a block diagram a schematically overview of an exemplary embodiment of the present invention.

According to the proposed solution turbulence characteristics like, e.g., turbulence intensity of incoming wind hitting the wind turbine will be determined based on rotor blade characteristics like, e.g., vibration strength of at least one respective rotor blade. Such kind of turbulence intensity derived based on blade characteristics may be also referred to as "equivalent turbulence intensity". Based on that, a turbine parameter like, e.g., acoustic emissions originating from the wind turbine during operation might be derived wherein the operation of the wind turbine might be controlled according to the derived acoustic emission.

FIG. 1 shows in a block diagram 100 a schematically overview of an exemplary embodiment of the proposed solution. Thereby, the block diagram is visualizing a sequence of process steps which might be logically separated in process steps (highlighted by a box 110) focusing on measurement, filtering and processing of at least one sensor signal and process steps (highlighted by a box 120) assigned to a turbine controller functionality.

According to the proposed approach the controller functionality 120 is based on several wind turbine specific correlations which, e.g., will be derived or defined and implemented in the respective wind turbine before starting it's designated operation, i.e. during setup of the wind turbine. "Implementing", as an example means organizing relevant information according to one or more look-up tables being stored in a memory of the respective wind turbine.

Thereby, a first correlation 121 is representing a relation of blade characteristics to inflow characteristics of atmosphere which are again specifically related to turbulence characteristics, e.g. of wind or airflow hitting the wind turbine. Turbulence characteristics may be a turbulence parameter of interest, like, e.g., a turbulence intensity, a turbulence kinetic energy or a turbulence dissipation rate.

Further on, a second correlation 122 is representing a relation of turbulence characteristics to at least one turbine specific turbine parameter like, e.g. acoustic emissions.

In this example, the second correlation 122 may be established between turbulence intensity and emitted sound levels, e.g. quantified by an overall Sound Pressure Level ("SPL").

Sound pressure or acoustic pressure is the local pressure deviation from the ambient (average, or equilibrium) atmospheric pressure, caused by a sound wave. In air, sound pressure can be measured using a microphone (see, e.g. https://en.wikipedia.org/wiki/Sound_pressure).

According to the proposed solution, the first and second correlation 121,122 are representing a wind turbine specific "physical model" (indicated by a box 123) based on that control information is derived being used for operation control (indicated by a box 124) of the respective wind turbine.

Each of the process steps will now be referred to and explained in more detail hereinafter:

Deriving HFAC ("high frequency accelerometer content") based on measured blade vibrations:

According to an exemplary embodiment of the proposed solution, turbulence characteristics of atmosphere hitting the wind turbine is derived during a first step 111 based on one or more accelerator sensors (also referred to as accelerometers") located in one or more blades of the wind turbine to assess "vibration strength" of the one or more rotor blades wherein vibration strength in turn is representing the turbulence intensity or turbulence level directly in the rotor plane.

As an example, a three-axis accelerometer is located at a, e.g., 30 m span wise station of each of the rotor blades. A measurement signal ("sensor signal"), i.e. an acceleration signal (referred by an arrow 130) is representing a result of vibration measurement along the flap wise axis, i.e. acceleration perpendicular to a chord line of the rotor blade. This measurement signal 130 may be used because the unsteady lift force due to turbulence is expected to be significantly higher than the unsteady drag force and should therefore result in a stronger vibration signal and thus in a more distinct acceleration signal 130. A possible sampling rate of that measurement signal 130 may be at 25 Hz.

During a next step 112 the resulting measurement signal 130 of step 111 is processed, e.g., by transforming into a frequency domain and by applying a filter between, e.g., 5 Hz and 12.5 Hz.

A resulting filtered measurement signal 131 (also referred to as "high frequency portion of the accelerometer signal spectrum") is passed to a subsequent process step 113 deriving the vibration strength of the respective rotor blade as one possible parameter of blade characteristics.

The metric used for the vibration strength is an "integrated energy of the signal" 131. This quantity may be referred to as a "high frequency accelerometer content" (HFAC) and may be calculated according to equation:

$$\text{HFAC} = [\int_{f_1}^{f_2} S_{aa}(f) df]^{0.5} \quad (1)$$

wherein $S_{aa}$ is the power spectral density of the accelerometer signal, and $f_1$ and $f_2$ are the lower and upper bounds, respectively, of the frequency range of interest.

The "high frequency accelerometer content" (HFAC) may be also referred to as signal energy.

For $S_{aa}$ given in units of $(m^2/s^4)/Hz$ the HFAC then has units of $m/s^2$ and is equivalent to a root-mean-square of the acceleration signal 130 if it were bandpass filtered between $f_1$ and $f_2$. The lower frequency bound might be chosen as, e.g., 5 Hz in order to avoid the dominant resonant modes of the blade, and the upper bound might be chosen according to the system's Nyquist frequency, i.e. 12.5 Hz.

The resulting HFAC (indicated by an arrow 132) may be forwarded as an input parameter to the controller functionality 120.

During setup of a wind turbine: Relating HFAC quantity to turbine kinetic energy of an airflow A scaling analysis may be used to relate a HFAC quantity to turbulence characteristics before start of operation of the wind turbine—the results of the scaling are implemented as the first correlation 121 defining the physical model 123.

Thereby, as an assumption, a turbulence wavelength in the frame of the blade is given by the following equation $$\lambda_T = \frac{u_{in}}{f} \quad (2)$$

wherein $u_{in}$ is the local mean blade inflow speed (i.e. the inflow speed incident at each spanwise section of the blade due to the wind and the rotor's rotational motion), and f is the frequency of the turbulent fluctuations at the blade surface.

Given the stated frequency range of 5 to 12.5 Hz and assuming typical blade local inflow speed speeds of between about 50 and 100 m/s, the turbulent fluctuations causing these vibrations will have wavelengths on the order of 5 to 20 m. This means that the turbulence wavelengths are very large with respect to the blade chord lengths, and a quasi-steady aerodynamic analysis should be sufficient. Under this assumption and the assumption of linear aerodynamics, the aerodynamic force on the blade is proportional to the local dynamic pressure F:

$$F \sim u^2 \quad (2.1)$$

wherein u is the local blade inflow speed.

The local blade inflow speed u may be expanded into the local mean blade inflow speed $u_{in}$ (mean term), and a local perturbation blade inflow speed u' (perturbation term)

wherein:

$$u = u_{in} + u'$$

and based on (2.1)

$$F \sim (u_{in} + u')^2 = u_{in}^2 + 2u_{in}u' + u'^2 \quad (2.2)$$

The right hand side of the proportionality now consists of a steady term $u_{in}^2$ and an unsteady term $2u_{in}u' + u'^2$. The steady term may be assumed to be balanced by a steady reaction force from the inner portion of the blade and will not contribute to the measured vibrations (i.e. the 1/rotation signal is significantly below 5 Hz). Additionally, the mean flow component $u_{in}$ is assumed to be much larger than the perturbation component u', thus the term $u'^2$ may be neglected. Further, a vibrational acceleration of the respective rotor blade is predicted to be proportional to the unsteady aerodynamic force on the blade (i.e. neglecting blade stiffness and damping effects in the vibrational system), resulting in an expected proportionality:

$$a \sim u_{in} u' \quad (2.3)$$

wherein a is a flapwise acceleration of the blade section $u_{in}$ is the local mean blade inflow speed u' is the local perturbation blade inflow speed Flow conditions in the frame of the rotor blade should be related to measurements made at the meteorological tower. Assuming local isotropy is realized at these length scales, as per Kolmogorov's hypothesis (see, e.g., https://en.wikipedia.org/wiki/Turbulence#Kolmogorov.27s_theory_of_1941), it follows that the fluctuation velocity u' is statistically independent of the orientation of the blade. Then, by its definition, a turbulence kinetic energy k is proportional to the mean-square of u', i.e.

$$k = \frac{1}{2}(\overline{u'^2} + \overline{v'^2} + \overline{w'^2}) = 3/2 \overline{u'^2} \quad (2.4)$$

where u, v, and w are the three velocity vector components. It should be noted that the fluctuation velocity in the frame of the blade section is expected to be equal (in a statistical sense) to the value measured in the stationary frame. That is, the rotational motion of the rotor affects the "mean" local inflow speed, but the fluctuations about the mean are independent of this motion. Thus, the turbulence kinetic energy k measured in the stationary frame should be approximately equal to the quantity in the frame of the blade. Taking the root-mean-square of both sides of the proportionality of equation (2.3), the final proportionality of the following equation is found $$a_{rms} \sim u_{in} k^{0.5} \quad (3)$$

where $a_{rms}$ is the root-mean-square of the filtered acceleration signal 131, k is representing the turbulence kinetic energy of the airflow, which is now given by the value measured by a ultrasonic anemometer at hub height on the meteorological tower, and $u_{in}$ is the local mean blade inflow speed.

The term $u_{in} k^{0.5}$ may be also referred to as "inflow characteristic" of atmosphere hitting the wind turbine.

The proportionality of equation (3) may be verified experimentally. FIG. 2 exemplarily shows the relationship/correlation between HFAC and a quantity $u_{in} k^{0.5}$ wherein HFAC (i.e. effectively $a_{rms}$ if the acceleration signal were band pass filtered between 5 and 12.5 Hz) is used in place of $a_{rms}$.

FIG. 2 illustrates in an abstract way a relationship/correlation between blade vibrations and turbulence intensity based on scaling relations used for simplicity. That is, various parameters have been absorbed into a single proportionality constant (which is referred as "A" hereinafter), e.g. the density of air, the mass of the blade, the lift coefficient of the blade, etc. This single proportionality constant A may readily be determined experimentally during setup of the wind turbine, as shown in FIG. 2, by correlation between direct measurements of turbulence characteristics using wind speed anemometry and direct measurements of the blade vibrations. The proportionality constant A will be both wind turbine specific and site dependent. The process of determining the proportionality constant A experimentally is expected to be far simpler and likely more accurate than an analytical calculation of the proportionality constant A, which would be highly cumbersome and involve the mass and lift distributions along the blade, along with a detailed turbulence distribution model.

The example of FIG. 2 is visualizing high frequency accelerometer content (HFAC) versus a quantity $k^{0.5} u_{in}$ representing the inflow characteristic of atmosphere hitting the wind turbine. Thereby, the turbulence kinetic energy k may be measured, e.g., by a sonic anemometer 200 m upwind of the wind turbine and takes several minutes of wind speed data to calculate. The quantity HFAC can be calculated using as little as several seconds of data. Each data point of FIG. 2 represents a 10 minute average.

Determining turbulence intensity $I_T$ representing turbulence characteristics

Consequently, the proportionality of equation (3) being reflected in FIG. 2 can be rephrased into $$k^{0.5} u_{in} = A * \text{HFAC}$$

wherein

A is representing a proportionality constant "A" to be determined experimentally (e.g. A=172.4), and $u_{in}$ is the local mean blade inflow speed to the section of the rotor blade which may be calculated based on the rotor speed of the blade and the wind speed.

According to a graph 200 visualized in FIG. 2 an abscissa 201 is representing a quantity $u_{in}k^{0.5}$ and a first ordinate 202 is representing HFAC (which is effectively $a_{rms}$ if the acceleration signal 130 were band pass filtered between 5 and 12.5 Hz) being used in place of $a_{rms}$.

The mean local inflow speed $u_{in}$ is calculated as the magnitude of the vector sum of the wind vector and rotational velocity at the location of the accelerometer. The value of HFAC is taken as the average value from the three blades. Each plotted point 210 represents a 10-minute segment of data, and the entire data set used encompasses roughly 40 hours of data. The data is colored by the mean wind speed U represented by a second ordinate 203 in order to show that the proportionality holds for a wide range of turbine operational conditions.

The linear fit shown in graph 200 (indicated by a line 220) may then be used to calculate the turbulence kinetic energy k for a given data segment. It should be noted that, while the values of turbulence kinetic energy k takes on the order of, e.g., 10 minutes to calculate due to the large length scales comprising the turbulence, the values of HFAC can be calculated for periods on the order of, e.g., seconds, being that it is specifically comprised only of frequencies above 5 Hz. In the analysis that follows, each HFAC value is mapped to a value of turbulence kinetic energy k from this linear relation 220, which is then used to calculate a turbulence intensity for each 15-second data segment. The resulting value for turbulence intensity may be also referred to as an "equivalent turbulence intensity" in order to reflect the fact that it is not a formally calculated turbulence intensity value.

Consequently, after determining an actual HFAC quantity based on root mean square of a filtered blade acceleration signal 131 and based on the known proportionality constant A and based on the known local mean blade inflow speed $u_{in}$, the corresponding value of turbine kinetic energy k can be derived according to $$k = \left(\frac{A * HFAC}{u_{in}}\right)^2$$

The corresponding value of turbulence intensity $I_T$ may be derived accordingly:

$$I_T = \frac{1}{u_{in}}\sqrt{\frac{2}{3}k}$$

The resulting value of (equivalent) turbulence intensity $I_T$ (indicated by an arrow 133 will be used as input parameter for the following process step based on the correlation 122.

During setup of a wind turbine: Relating sound pressure "SPL" quantity to turbulence intensity quantity:

FIG. 3 is showing a graph 300 with an abscissa 301 representing (equivalent) turbulence intensity $I_T$ and with an ordinate 302 representing a sound pressure level SPL quantified in dB (decibel) units. The graph 300 visualizes the correlation 122 of the overall SPL against (equivalent) turbulence intensity $T_I$ measured by blade accelerations. Similar to relation 121 relation 122 has been determined experimentally before start of operation of the wind turbine and has been stored accordingly in the memory of the wind turbine. Thereby, each data point 310 is representing a 15 second measurement. A curve 320 is showing a logarithmic fit of a value distribution of the data points 310.

Determining Sound Pressure Level "SPL" Representing Acoustic Emissions

Based on the determined turbulence intensity value 133 and based on the correlation 122 already stored during setup of the wind turbine the corresponding SPL value (indicated by an arrow 134) may be determined which is representing the acoustic emissions currently originating from the wind turbine.

Controlling Wind Turbine Operation

The determined acoustic emissions represented by the SPL value 134 will be used as input parameter for controlling the operation of the wind turbine (124) by adjusting at least one wind turbine parameter of interest like, e.g., at least one out of the following:
  blade pitch,
  rotor torque,
  rotor speed (RPM, revolution per minute)

It should be noted that determining the turbulence intensity 133 based on blade vibrations, i.e. vibration strength is one exemplary embodiment of the proposed solution of deducing turbulence characteristics of atmosphere. Further possible embodiments may be
  a direct determination of turbulence kinetic energy, and/or
  a determination of a turbulence dissipation rate, and/or
  deriving a correlation of the HFAC to acoustic emissions.

According to further alternative embodiments of the proposed solution, different kind of sensors may be used, like, e.g., strain gauge sensors which may be assigned to one or more rotor blades. Thereby, blade deformations related to blade vibrations may be also detected by strain gauge sensors. Following an almost identical process would then yield a proportionality between unsteady blade strain ("blade characteristics") and turbulence characteristics, and, in turn, a method of measuring turbulence characteristics like turbulence intensity using strain gauges.

According to a further alternative embodiment, blade characteristics may be determined based on unsteady pressure on at least one rotor blade near the leading edge. Thereby, pressure fluctuations near the leading edge of a rotor blade, where the blade aerodynamic boundary layer has not transitioned to a turbulence state, are due to inflow characteristics and thus turbulence characteristics. Consequently, determining turbulence characteristics based on measured pressure characteristics on the rotor blade would also enable the proposed determination of acoustic emission.

Control of the rotor or rotor hub will depend on the determination method (accelerometers, strain or remote sensing) and the control parameter(s) the turbine uses to adjust its operation. As an example, the wind turbine has several current and possibly future technologies which can be applied to control the acoustic emissions when increasing turbulence intensity is determined. These include rotor RPM, combined pitch, individual pitch, passive or active flaps and even yaw angle. All of these methods would have the same fundamental goal, to maintain the desired acoustic emission, characterized by at least one acoustic parameter such as SPL, and therefore requiring compensation for increased levels of turbulence-induced noise. Ideally the control scheme will be optimized in order to maintain the desired acoustic emission while simultaneously maximizing electrical power output from the turbine.

The basic level of control would be to reduce rotor RPM's and, in turn, blade speed, which will directly reduce the noise generated by the turbulence. A secondary control scheme would be to have the rotor pitch out (lower angles of attack) when increases in turbulence intensity is sensed. This could be applied also on a slower scale through slow acting flaps or yawing the turbine to reduce the stall margin on the blades and ensure noise compliance of the rotor acoustic emissions. A more sophisticated method of control would be to use time history of measured signals (or remote sensing) to determine the best blade operation (pitch angle or flap angle) on a blade to blade basis. As fluctuations in wind speed will have some gradient, using the previous blades data (vibration, strain, etc) to control the next blade's operation. This would be a continuous loop as each successive blade would be used to control the following blade.

If remote sensing technology is utilized than a sampling of the incoming wind field could be taken before it hits the rotor. By knowing what winds to expect, the rotor could anticipate the wind and may operate in the best condition for that specific piece of wind hitting it. For that, a continuous feed-forward control system would need to be utilized so the wind field in front of a blade would be monitored and known by the turbine in order to make appropriate adjustments in the turbines operation.

Active flaps also would give more flexibility in operation as they could adjust operation along the whole rotor individually and independently of each other (unlike blade pitch which would adjust the entire blade). This would mean that local turbulence variations could be dealt with along the entire span of the blade, not only on a collective basis.

By accurately and rapidly assessing turbulence characteristics and compensating appropriately, it would be possible to guarantee acoustic emissions like noise levels up to higher turbulence intensities and offer the ability to have an adaptive control that will compensate for these changing turbulence intensities. The proposed solution uses the measured vibrational energy in the blade at frequencies above 5 Hz for assessment of turbulence characteristics. According to an exemplary embodiment a blade-mounted flapwise accelerometer at 30 m spanwise station may be used. As already explained in relation to FIG. 2 high frequency accelerometer content (HFAC) correlates well to the 10-minute averaged turbulence intensity. The benefit is then that this vibrational energy can be measured over far shorter periods of time-on the order of seconds-making it more conducive to use as a control system measurement.

Accelerometer measurements can be used to assess turbulence characteristics in seconds, rather than several minutes. In addition, the measurement is made directly on the blade which is the most significantly affected by the change in inflow conditions and is the primary turbulence-noise generating body. For this reason, and the sensors robustness, blade-mounted accelerometers offer a good solution for receiving real time feedback that can be used in a control strategy.

The quantity HFAC described above is based on accelerometer signal spectral content only above, e.g., 5 Hz. This means that the quantity can be calculated in as little as, e.g., 0.2 seconds. However, longer calculation times are likely beneficial for the purposes of robustness, where specific requirements are yet to be determined. By monitoring the change of the HFAC, the turbine controller can adapt to be more or less aggressive in its pitch settings and rates.

The proposed solution is offering the ability to maximize the turbines energy performance while maintaining acoustic compliance. This results in better ROR for turbine owners and better relations between the turbine owners, turbine neighbors and provider or wind turbine technology.

As an advantage, contractual terms and guaranties offered on wind turbine equipment may be expanded which results in a better competitive position of the respective wind turbine supplier in the global market.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a wind turbine, comprising:
deriving at least one turbulence characteristic of atmosphere hitting the wind turbine based on at least one measured rotor blade characteristic of at least one rotor blade of the wind turbine, and on a first correlation between rotor blade characteristics of at least one rotor blade of the wind turbine and wind turbine specific inflow characteristics of atmosphere hitting the wind turbine;
determining at least one wind turbine specific parameter based on the at least one derived turbulence characteristic and based on a second correlation between turbine specific turbulence characteristics and turbine specific parameter; and
operating the wind turbine according to the at least one determined turbine specific parameter.

2. The method according to claim 1, wherein the at least one wind turbine specific parameter is representing acoustic emissions.

3. The method according to claim 1, wherein the at least one rotor blade characteristics is a vibration strength of at least one rotor blade.

4. The method according to claim 3, wherein the vibration strength of the at least one rotor blade is derived based on at least one measurement signal provided by:
at least one accelerator sensor, and/or
at least one strain gage sensors, and/or
at least one unsteady pressure sensor assigned to the at least one rotor blade.

5. The method according to claim 4, wherein the at least one measurement signal is filtered in a definable frequency range.

6. The method according to claim 5, wherein a signal energy of the at least one filtered measurement signal is determined.

7. The method according to claim 6, wherein the first correlation is representing a proportionality between the signal energy and a quantity $$k^{0.5}u_{in}$$

wherein
k is representing a turbulence kinetic energy,
$u_{in}$ is the local mean blade inflow speed.

8. The method according to claim 1, wherein
the at least one turbulence characteristic is:
a turbulence intensity, or
a turbulence kinetic energy, or
a turbulence dissipation.

9. The method according to claim 8, wherein a value of the turbulence intensity is derived according to:

$$I_T = \frac{1}{u_{in}}\sqrt{\frac{2}{3}k}$$

wherein
$I_T$ is representing the turbulence intensity
$u_{in}$ is the local mean blade inflow speed
k is the turbulence kinetic energy.

10. The method according to claim 9, wherein the turbulence kinetic energy is derived according to $$k = \left(\frac{A*HFAC}{u_{in}}\right)^2$$

wherein
A is a proportionality constant being defined by the first correlation
HFAC is the signal energy
$u_{in}$ is the local mean blade inflow speed.

11. A wind turbine, comprising:
a processing unit that is arranged for:
  deriving at least one turbulence characteristic of atmosphere hitting the wind turbine based on at least one measured rotor blade characteristic of at least one rotor blade of the wind turbine, and on a first correlation between rotor blade characteristics of at least one rotor blade of the wind turbine and wind turbine specific inflow characteristics of atmosphere hitting the wind turbine;
  determining at least one wind turbine specific parameter based on the at least one derived turbulence characteristic and based on a second correlation between turbine specific turbulence characteristics and turbine specific parameter; and
  operating the wind turbine according to the at least one determined turbine specific parameter.

12. A device comprising and/or being associated with a processor unit and/or hard-wired circuit and/or a logic device that is arranged such that the method according to claim 1 is executable thereon.

13. A computer program product directly loadable into a memory of a digital computer, comprising software code portions for performing the steps of the method according to claim 1.

14. A computer readable medium, having computer-executable instructions adapted to cause a computer system to perform the steps of the method according claim 1.

* * * * *